United States Patent
Julian et al.

(10) Patent No.: US 8,289,159 B2
(45) Date of Patent: Oct. 16, 2012

(54) WIRELESS LOCALIZATION APPARATUS AND METHOD

(75) Inventors: David Jonathan Julian, San Diego, CA (US); Chong U. Lee, San Diego, CA (US); Kamran Moallemi, Del Mar, CA (US); Manuel E. Jaime, Solana Beach, CA (US); Michael James Wengler, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 11/739,633

(22) Filed: Apr. 24, 2007

(65) Prior Publication Data

US 2007/0279237 A1   Dec. 6, 2007

Related U.S. Application Data

(60) Provisional application No. 60/795,772, filed on Apr. 28, 2006, provisional application No. 60/795,436, filed on Apr. 26, 2006.

(51) Int. Cl.
*G08B 1/08* (2006.01)

(52) U.S. Cl. .............. 340/539.32; 342/350; 701/468

(58) Field of Classification Search .............. 340/539.1, 340/539.11, 539.13, 539.14, 539.15, 539.22, 340/539.23, 540, 686.1; 342/350, 357.2, 342/357.23; 701/468, 469, 519
See application file for complete search history.

(56) References Cited

U.S. PATENT DOCUMENTS

| | | | |
|---|---|---|---|
| 4,796,004 A | | 1/1989 | Rich et al. |
| 5,196,825 A | * | 3/1993 | Young ............... 340/539.11 |
| 5,225,842 A | | 7/1993 | Brown et al. |
| 5,298,904 A | * | 3/1994 | Olich ..................... 342/42 |
| 5,341,481 A | | 8/1994 | Tsukamoto |
| 5,406,284 A | | 4/1995 | Lin et al. |
| 5,479,522 A | | 12/1995 | Lindemann et al. |
| 5,617,058 A | | 4/1997 | Adrian et al. |
| 5,687,169 A | | 11/1997 | Fullerton |
| 5,742,772 A | | 4/1998 | Sreenan |

(Continued)

FOREIGN PATENT DOCUMENTS

CN            1647458 A        7/2005

(Continued)

OTHER PUBLICATIONS

International Preliminary Report on Patentability—PCT/US07/067571, The International Bureau of WIPO—Geneva, Switzerland, Oct. 28, 2008.

(Continued)

*Primary Examiner* — George Bugg
*Assistant Examiner* — Edny Labbees
(74) *Attorney, Agent, or Firm* — Dang M. Vo; Paul S. Holdaway

(57) ABSTRACT

The location of a device may be determined with respect to another device. For example, a locating device may be moved as it measures at least one distance to a target device. The locating device may then generate one or more indications relating to the measured distance or distances. The locating device also may generate one or more indications relating one or more determined directions to the target device. The target device may be moved in a predetermined manner to determine the location of the target device. Each of the devices may employ a single transceiver and a single antenna for the location determination operations.

70 Claims, 8 Drawing Sheets

U.S. PATENT DOCUMENTS

| | | |
|---|---|---|
| 5,764,696 A | 6/1998 | Barnes et al. |
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,956,683 A | 9/1999 | Jacobs et al. |
| 5,960,031 A | 9/1999 | Fullerton et al. |
| 5,963,581 A | 10/1999 | Fullerton et al. |
| 5,969,663 A | 10/1999 | Fullerton et al. |
| 5,995,534 A | 11/1999 | Fullerton et al. |
| 6,028,853 A | 2/2000 | Haartsen |
| 6,031,862 A | 2/2000 | Fullerton et al. |
| 6,091,374 A | 7/2000 | Barnes |
| 6,111,536 A | 8/2000 | Richards et al. |
| 6,111,538 A | 8/2000 | Schuchman et al. |
| 6,133,876 A | 10/2000 | Fullerton et al. |
| 6,141,705 A | 10/2000 | Anand et al. |
| 6,177,903 B1 | 1/2001 | Fullerton et al. |
| 6,178,323 B1 | 1/2001 | Nagata |
| 6,218,979 B1 | 4/2001 | Barnes et al. |
| 6,295,019 B1 | 9/2001 | Richards et al. |
| 6,297,737 B1 * | 10/2001 | Irvin .................. 340/571 |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,515,588 B1 * | 2/2003 | Sarabia ............... 340/568.1 |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,594,628 B1 | 7/2003 | Jacobs et al. |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,693,571 B2 | 2/2004 | Melanson et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,831,508 B2 | 12/2004 | Shima |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,868,073 B1 * | 3/2005 | Carrender ............... 370/278 |
| 6,879,878 B2 | 4/2005 | Glenn et al. |
| 6,882,301 B2 | 4/2005 | Fullerton |
| 6,895,034 B2 | 5/2005 | Nunally et al. |
| 6,898,414 B2 | 5/2005 | Ekl et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,924,700 B2 | 8/2005 | Taura et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,020,701 B1 | 3/2006 | Gelvin et al. |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,034,609 B2 | 4/2006 | Risbo et al. |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,057,456 B2 | 6/2006 | Taura et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,206,423 B1 | 4/2007 | Feng et al. |
| 7,209,724 B2 | 4/2007 | Richards et al. |
| 7,230,980 B2 | 6/2007 | Langford et al. |
| 7,239,277 B2 | 7/2007 | Fullerton et al. |

| | | | |
|---|---|---|---|
| RE39,759 E | 8/2007 | Fullerton | |
| 7,256,727 B2 | 8/2007 | Fullerton et al. | |
| 7,271,779 B2 | 9/2007 | Hertel | |
| 7,279,965 B2 | 10/2007 | Hansen et al. | |
| 7,286,009 B2 | 10/2007 | Andersen et al. | |
| 7,324,479 B2 | 1/2008 | Hur | |
| 7,348,840 B2 | 3/2008 | Magrath et al. | |
| 7,388,886 B2 | 6/2008 | Perkins et al. | |
| 7,576,605 B2 | 8/2009 | Lee et al. | |
| 2001/0049471 A1 | 12/2001 | Suzuki et al. | |
| 2002/0109501 A1* | 8/2002 | Schroeder | 324/207.21 |
| 2002/0109601 A1* | 8/2002 | Arens | 340/573.1 |
| 2003/0002698 A1 | 1/2003 | Ludvigsen | |
| 2003/0078065 A1 | 4/2003 | Hoagland et al. | |
| 2003/0125090 A1 | 7/2003 | Zeira | |
| 2003/0227984 A1 | 12/2003 | Batra et al. | |
| 2004/0001588 A1 | 1/2004 | Hairston | |
| 2004/0032363 A1 | 2/2004 | Schantz et al. | |
| 2004/0062325 A1 | 4/2004 | England et al. | |
| 2004/0128382 A1 | 7/2004 | Shimoda et al. | |
| 2004/0164902 A1 | 8/2004 | Karlsson et al. | |
| 2004/0202339 A1 | 10/2004 | O'Brien, Jr. et al. | |
| 2004/0203797 A1 | 10/2004 | Burr | |
| 2004/0207465 A1 | 10/2004 | Nilsson | |
| 2004/0242250 A1 | 12/2004 | Sasai et al. | |
| 2004/0247023 A1 | 12/2004 | Sasai et al. | |
| 2004/0259449 A1 | 12/2004 | Onder de Linden et al. | |
| 2005/0025117 A1 | 2/2005 | Inagaki et al. | |
| 2005/0107104 A1 | 5/2005 | Rajkotia | |
| 2005/0113157 A1 | 5/2005 | Jaakola | |
| 2005/0138470 A1 | 6/2005 | Cromer et al. | |
| 2006/0016452 A1* | 1/2006 | Goetz et al. | 128/899 |
| 2006/0026288 A1 | 2/2006 | Acharya et al. | |
| 2006/0028272 A1 | 2/2006 | Ozawa et al. | |
| 2006/0089138 A1 | 4/2006 | Smith et al. | |
| 2006/0146751 A1 | 7/2006 | Obuchi et al. | |
| 2006/0166663 A1 | 7/2006 | Haehnichen et al. | |
| 2006/0208794 A1 | 9/2006 | Morishima | |
| 2006/0281476 A1 | 12/2006 | Lane et al. | |
| 2007/0054643 A1 | 3/2007 | Kraegeloh et al. | |
| 2007/0073944 A1 | 3/2007 | Gormley | |
| 2007/0254728 A1 | 11/2007 | Moallemi et al. | |
| 2007/0281721 A1 | 12/2007 | Lee et al. | |
| 2008/0009275 A1 | 1/2008 | Werner et al. | |
| 2008/0043824 A1 | 2/2008 | Jacobs et al. | |
| 2008/0045161 A1 | 2/2008 | Lee et al. | |
| 2008/0279167 A1 | 11/2008 | Cardei et al. | |

FOREIGN PATENT DOCUMENTS

| | | |
|---|---|---|
| CN | 1722785 A | 1/2006 |
| CN | 1723677 A | 1/2006 |
| EP | 1469594 A1 | 10/2004 |
| GB | 2388279 | 11/2003 |
| JP | 5180925 | 7/1993 |
| JP | 11146030 A | 5/1999 |
| JP | 2001169345 | 6/2001 |
| JP | 2001344352 A | 12/2001 |
| JP | 2004507714 T | 3/2004 |
| JP | 2004357281 A | 12/2004 |
| JP | 2005005962 A | 1/2005 |
| JP | 2005020350 A | 1/2005 |
| JP | 2005099018 A | 4/2005 |
| JP | 2005128965 A | 5/2005 |
| JP | 2005295380 A | 10/2005 |
| JP | 2008503011 A | 1/2008 |
| KR | 20030008999 A | 1/2003 |
| TW | 200307141 | 12/2003 |
| TW | I247131 | 1/2006 |
| WO | WO0187014 A2 | 11/2001 |
| WO | 0194974 | 12/2001 |
| WO | WO2004053655 A2 | 6/2004 |
| WO | WO2005083461 A1 | 9/2005 |
| WO | WO2005121959 A2 | 12/2005 |
| WO | WO2006028547 A1 | 3/2006 |

OTHER PUBLICATIONS

Written Opinion—PCT/US07/067571, International Search Authority—European Patent Office, Nov. 26, 2007.

International Search Report—PCT/US07/067571—International Search Authority—European Patent Office—Nov. 26, 2007.

Gulden P et al: "Wireless local positioning" IEEE Microwave Magazine, IEEE Service Center, Piscataway, NJ, USA, vol. 4, No. 4, Dec. 2003, pp. 77-86, XP011107180.

Borenstein J et al: "Robotics-based obstacle-avoidance systems for the blind and visually impaired—Navbelt and the guidecane" IEEE Robotics & Automation Magazine, IEEE Service Center, Piscataway, NJ, USA, vol. 10, No. 1, Mar. 2003, pp. 9-20, XP011095797.

Chiasserini C F; Rao R R: "On the concept of distributed digital signal processing in wireless sensor networks" Oct. 7, 2002, pp. 260-264, XP010632110 IEEE Military Communications Conference. MILCOM 2002. Proceedings Anaheim, CA.

Ian Galton: "Delta-Sigma Data Conversion in Wireless Transceivers" IEEE Transactions on Microwave Theory and Techniques, IEEE Service Center, vol. 50, No. 1, Jan. 1, 2002, pp. 302-315, XP011038571.

Istepanian et al: "Guest Editorial Introduction to the Special Section on M-health: Beyond Seamless Mobility and Global Wireless Health-Care Connectivity" IEEE Transactions on Information Technology in Biomedicine, IEEE Service Center, vol. 8, No. 4, Dec. 2004, pp. 405-414, XP011122717.

Jones et al., "Modelling Mobile Health Systems: An Application of Augmented MDA for the Extended Healthcare Enterprise" EDOC Enterprise Computing Conference, 2005 Ninth IEEE International Enschede, The Netherlands, Sep. 19-23, 2005, Piscataway, NJ, USA, IEEE p. 58-69.

Kredo K. et al., "Medium Access Control in Wireless Sensor Networks," Computer Networks, Dec. 28, 2006, pp. 961-994, vol. 51, No. 4, Elsevier Science Publishers BV Amsterdam, NL.

Magrath, A. J. et al.: "Hybrid Pulse Width Modulation/Sigma Delta Modulation Power Digital-to-Analogue Converter," IEEE Proceedings: Circuits Devices and Systems, Institution of Electrial Engineers, Stenvenage, GB, vol. 143, No. 3, Jun. 10, 1996, pp. 149-156.

Sekine M. et al., "An Energy-Effidient Protocol for Active/Sleep Schedule Synchronization in Wireless Sensor Networks," IEEE 2006 Asia-Pacific Conference on Communications, Aug. 2006, pp. 1-5.

Sundararaman B. et al., "Clock Synchronization for Wireless Sensor Networks: a Survey," Ad Hoc Networks, Elsevier, May 2005, pp. 281-323, vol. 3, No. 3, University of Illinois, Chicago, IL, USA.

Taiwanese Search report—096114067—TIPO—Nov. 20, 2010.

Taiwanese Search report—096115093—TIPO—Oct. 11, 2010.

Vasudevan S. et al., "Design and Analysis of a Leader Election Algorithm for Mobile Ad Hoc Networks," Network Protocols, 2004, ICNP 2004, Proceedings of the 12th IEEE International Conference on Berlin, Germany, Oct. 5, 2004, pp. 350-360.

Xu et al: "Distributed computing paradigms for collaborative signal and information processing in sensor networks" Aug. 1, 2004, Journal of Parallel and Distributed Computing, pp. 945-959, XP004525538.

Z. Shi, "Sigma-Delta ADS and DAC for Digital Wireless Communication." 1999 IEEE Radio Frequency Integrated Circuits Symposium, pp. 57-62.

Taiwanese Search Report—096113704—TIPO—Jan. 9, 2011.

\* cited by examiner

WIRELESS LOCALIZATION APPARATUS AND METHOD

CLAIM OF PRIORITY UNDER 35 U.S.C. §119

This application claims the benefit of and priority to commonly owned U.S. Provisional Patent Application No. 60/795,436, filed Apr. 26, 2006, entitled, "System for personal body area network mobile telemetry and bio-sensing," and U.S. Provisional Patent Application No. 60/795,772, filed Apr. 28, 2006, entitled, "Method for Asset Localization with a Single Antenna,", the disclosure of each of which is hereby incorporated by reference herein.

BACKGROUND

1. Field

This application relates generally to wireless localization, and to localization between wireless devices.

2. Background

Various techniques are known for determining the location of an object. For example, a radar system determines the location of an object by directing radio frequency ("RF") signals toward the object and detecting the signals that reflect off of the object. The distance of the object from the radar system may then be determined by analyzing the received signal to, for example, determine the time it takes for the signals to travel to the object and back.

Some tracking schemes employ a two-way ranging technique whereby each device involved in a distance determination operation employs a transceiver that sends signals to the other transceiver. For example, a first device that wishes to determine the relative distance to a second device may initiate a location determination operation by sending a signal to the second device. After receiving the signal, the second device sends a responsive signal back to the first device. The first device may then determine the distance between the devices based on the received signal. For example, the first device may determine the distance by calculating the time it takes for the signals to propagate between the devices.

Ranging techniques also may be employed to determine the relative direction between devices. For example, a tracking device may include multiple receive antennas, multiple transmit antennas, or both, that are spaced apart by a distance that is large enough to create sufficiently different signal paths for each antenna. The measuring device may then determine the relative direction to the device being tracked by triangulating signals received via each signal path. For example, a distance may be calculated between each antenna and the antenna of the device being tracked. The relative direction between the devices may then be determined based on these distances and based on the known distance between the antennas of the tracking device.

There are a number of situations where ranging techniques could potentially be used by a person to locate another object. For example, a person may wish to locate keys or another person (e.g., a child). In practice, however, a device that includes directional locating capabilities may be too large for certain applications due to the relatively wide spacing between the antennas. Moreover, such a device may utilize separate RF front-ends (e.g., transceivers) for each antenna, thereby increasing the cost of the device.

SUMMARY

A summary of sample aspects of the disclosure follows. It should be understood that any reference to aspects herein may refer to one or more aspects of the disclosure.

The disclosure relates in some aspects to determining a location of a device. In some aspects the device may comprise or be associated with a stationary or movable object to be located. Here, the location of the device may relate to the distance to the device, the direction to the device from a given vantage point, or both.

The disclosure relates in some aspects to a locating device that is moved about to generate at least one indication relating to the distance between the locating device and a target device. Here, the locating device may measure the distance to the target device several times as the target device is moved. For example, the locating device may measure the distance to the target device when the locating device is a first position and then when it is at a second position.

In some aspects the locating device may generate one or more indications relating one or more measured distances. For example, the locating device may generate one or more indications as it is moved. Here, the locating device may generate an audible, visual, or temperature indication that indicates whether a current location of the locating device is closer to or further away from the target device than a prior location of the locating device. The locating device also may generate a measured distance indication at the end of the location determining operation. For example, the locating device may display the actual distance between the devices once the locating device stops moving.

The disclosure relates in some aspects to determining the location of the target device based on the distance measurements between the devices and based on the distances between the positions of the locating device at which the locating device measured the distances to the target device. For example, triangulation, trilateration, or some other suitable technique may be used to determining the direction to the target device based on the measured distances and the distance between the first and second positions mentioned above. Here, the distance between the positions may be determined through the use of a motion detection component (e.g., an accelerometer) or by moving the locating device in a deterministic manner. As an example of the latter scenario, the locating device may measure distances to the target device as the locating device is moved according to a predetermined pattern. In this case, the locating device may determine the distances between the various measurement positions by correlating the timing of each distance measurement with locations within the predetermined pattern.

Through the use of the above techniques the locating device may generate an indication relating to the direction to the target device from the perspective of the locating device. As discussed above, the locating device may generate indications as the locating device is moved. That is, the locating device may generate an audible, visual, or temperature indication of the direction to the target device with respect to the locating device at any given moment in time. In some aspects the locating device also may generate an indication at the end of the location determining operation. For example, once the locating device has stopped moving the locating device may display an indication that points in the direction of the target device.

In some aspects the locating device may utilize signals received from the target device to determine the location of the target device. For example, in some implementations the devices may use a two-way ranging technique to perform the distance measurements. In this case, the locating device may measure the distance based on a signal it receives from the target device in response to a signal the locating device sent to the target device.

The locating device may utilize one or more of various signal processing techniques to determine the distance between the devices. For example, the locating device may determine the distance between the devices based on the signal strength of a received signal, based on the propagation delay of a received signal, or based on a relative phase of a received signal.

In some aspects the devices may advantageously employ a single antenna. For example, the distance measurement operations may be performed in a sequential manner such that the locating device may utilize a single antenna and a single transceiver to transmit and receive signals. Similarly, the target device may utilize a single antenna and a single transceiver to transmit and receive signals. Consequently, the devices may be constructed using fewer parts, thereby potentially providing a smaller form factor and lower cost.

BRIEF DESCRIPTION OF THE DRAWINGS

These and other features, aspects and advantages of the disclosure will be more fully understood when considered with respect to the following detailed description, appended claims and accompanying drawings, wherein:

Figure 1:
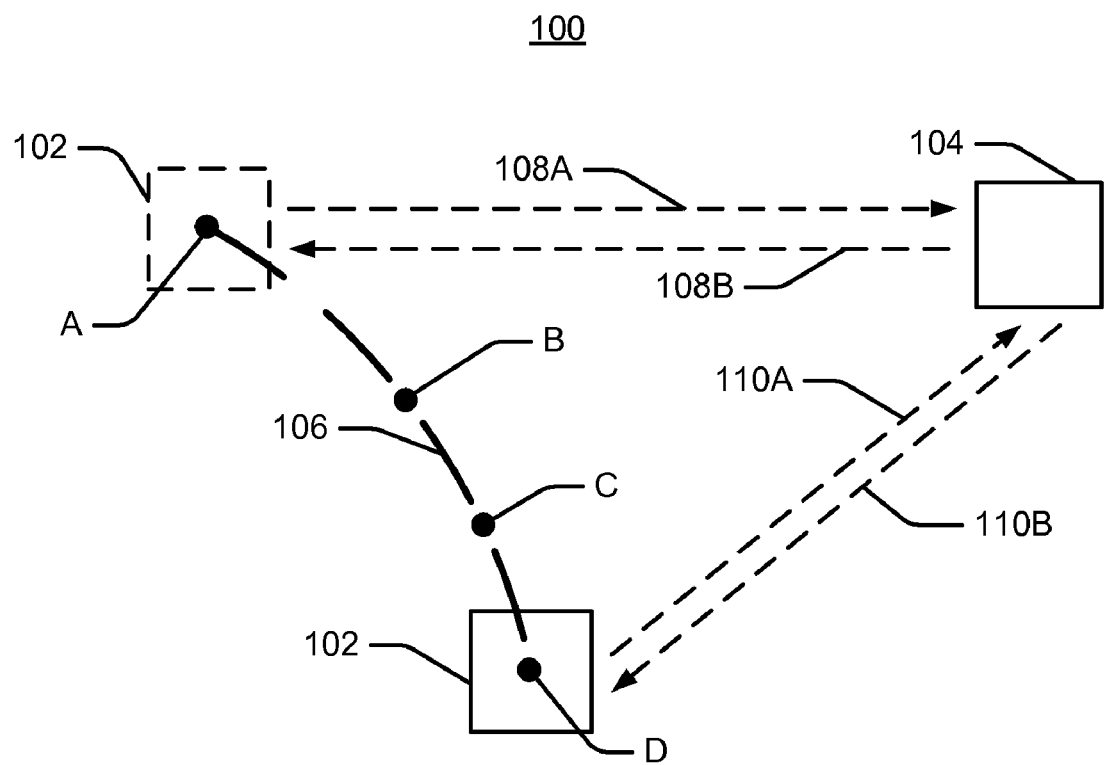
FIG. 1 is a simplified diagram of several sample aspects of an object locating system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of the above, in some aspects a device may be located based on first and second signals received when another device is at first and second locations, respectively. In addition, in some aspects a device may be located by generating at least one indication of a distance between the devices and a direction to one device from the other device.

FIG. 1 illustrates sample aspects of a system 100 where a first device 102 determines the relative location of a second device 104. In some implementations, the second device 104 may be associated with (e.g., attached to, held by, implemented within, and so on) an object to be tracked. In such a case, a location determination operation may be invoked or otherwise enabled on the device 102 (e.g., by actuating a switch on the device 102) whenever it is desired to determine the location of the object.

In some aspects the location determination operation involves moving the device 102 about and utilizing distance-based indications provided by the device 102 to determine the direction to the device 104. For example, the frequency of an audible indication may increase or the shade of a color indication may darken as the distance between the devices 102 and 104 decreases. Thus, a user of the device 102 may determine the direction to the device 104 by moving the device 102 around to determine which direction results in an indication of shortest distance to the target device. For example, if the device 102 is moved along an arc, some point along the arc may be associated with the highest frequency or the darkest shade. A virtual line directed from the center point of the arc through the point on the arc associated the highest frequency or the darkest shade may then point to the device 104. As will be discussed in more detail below it should be appreciated that the indication generated by the device 102 may take various other forms.

FIG. 1 illustrated an example where a location determination operation involves moving the device 102 along a path as represented by the dashed line 106. Here, the device 102 is moved from a location (e.g., position) designated by point A (where the prior location of the device 102 is depicted as a dashed box) to a location designated by point D.

As the device 102 is moved along the path 106 the device 100 determines the distance to the device 104 from various locations along the path 106. For example, the device 102 may determine the distance to the device 104 when the device 102 is at location A. In addition, the device 102 may determine the distance to the device 104 when the device 102 is at location D.

As represented by the dashed lines 108A, 108B, 110A, and 110B, the device 102 may determine the distance at each location based on one or more signals transmitted between the devices 102 and 104 in accordance with a standard ranging technique. For example, in an implementation that utilizes a two-way ranging technique, the device 102 may transmit signals 108A and 110A to the device 104 to initiate distance determination operations at locations A and D, respectively. In response, the device 104 may transmit signals 108B and 110B back to the device 102. Examples of the form and use of such signals will be discussed in more detail below.

In accordance with some aspects of the disclosure, the path 106 may comprise a substantially predetermined path. In this case, a user of the device 102 may be instructed to move the device 102 along the path to perform a location determination operation.

The path 106 may comprise a predetermined pattern that is defined in a discrete or continuous manner. For example, a discrete pattern may comprise two or more locations that are at a given distance from one another (e.g., 0.5 meter apart). In a simple example, a user may move the device 102 by 0.5 meter to the left, and then move the device 102 by 0.5 meter to the right. A continuous pattern may comprise a line, an arc, or relate to some other suitable motion of the device 102. Thus, in this case, the user may move the device 102 along the defined line, arc, etc., to determine the location of the device 104.

One or more other criteria may be associated with the predetermined path. For example, such criteria may include a starting position, an ending position, and a period of time that the device 102 is to be moved through the predetermined pattern. As a specific example, the user may move the device 102 in a sweeping motion through a two foot arc from left to right over a two second period. Through the use of a predetermined path, each location at which the device 102 determines the distance to the device 104 may be known (within a given degree of error). Consequently, the relative distance or distances between these locations may be readily determined.

In some aspects a user input device may be employed to facilitate a location determination operation. For example, in some implementations the user may press a button to indicate certain events of the location determination operation. As a specific example, a user may actuate a button on the device 102 to commence a location determination operation, then actuate the button again when a certain phase of the movement is completed (e.g., moving the device 102 to left), then actuate the button again after the movement of the device 102 is complete (e.g., after the device 102 is moved back to the right). In some implementations a user may hold down a button during a location determination operation (e.g., during the entire time the device 102 is being moved).

In accordance with some aspects of the disclosure, the device 102 may include a location tracking component (e.g., an accelerometer) for determining the relative distance or distances between each location at which the device 102 measures the distance to the device 104. In this case, the device 102 may not necessarily be moved in a predetermined manner. For example, the location tracking component may be able to determine the positions at which the device 102 measures distance even if the device 102 is moved in a random manner.

As the device 102 determines the distance to the device 104, the device 102 may generate one or more indications relating to the measured distance or to the relative direction of the device 104. For example, a measured distance may be indicated at one or more locations along the path 106. In the example of FIG. 1, the device 102 may generate indications as it traverses the path 106 at locations A, B, C, and D or after it has completed traversing the path. In some implementations the device 102 may indicate whether it is getting closer to or further away from the device 104 as the device 102 is moved through the path 106. The device 102 also may indicate the actual distance between the devices 102 and 104 at any point along the path 106. In addition, the device 102 may indicate the direction to the device 104 relative to the device 102 at any point along the path 106. Such an indication may take the form of an audible indication, a visual indication, a temperature indication, some other suitable indication, or some combination of two or more of these indications.

The devices 102 and 104 may take various forms or may be implemented in a variety of devices. For example, in some implementations the device 102 may comprise a portable device such as a cell phone, a portable entertainment device (e.g., a music player), a personal data assistant, a watch, and so on. In some implementations the device 104 may comprise a relatively small device that may be easily carried by person, attached to a keychain, or attached to or incorporated into some other type of object.

Figure 2:
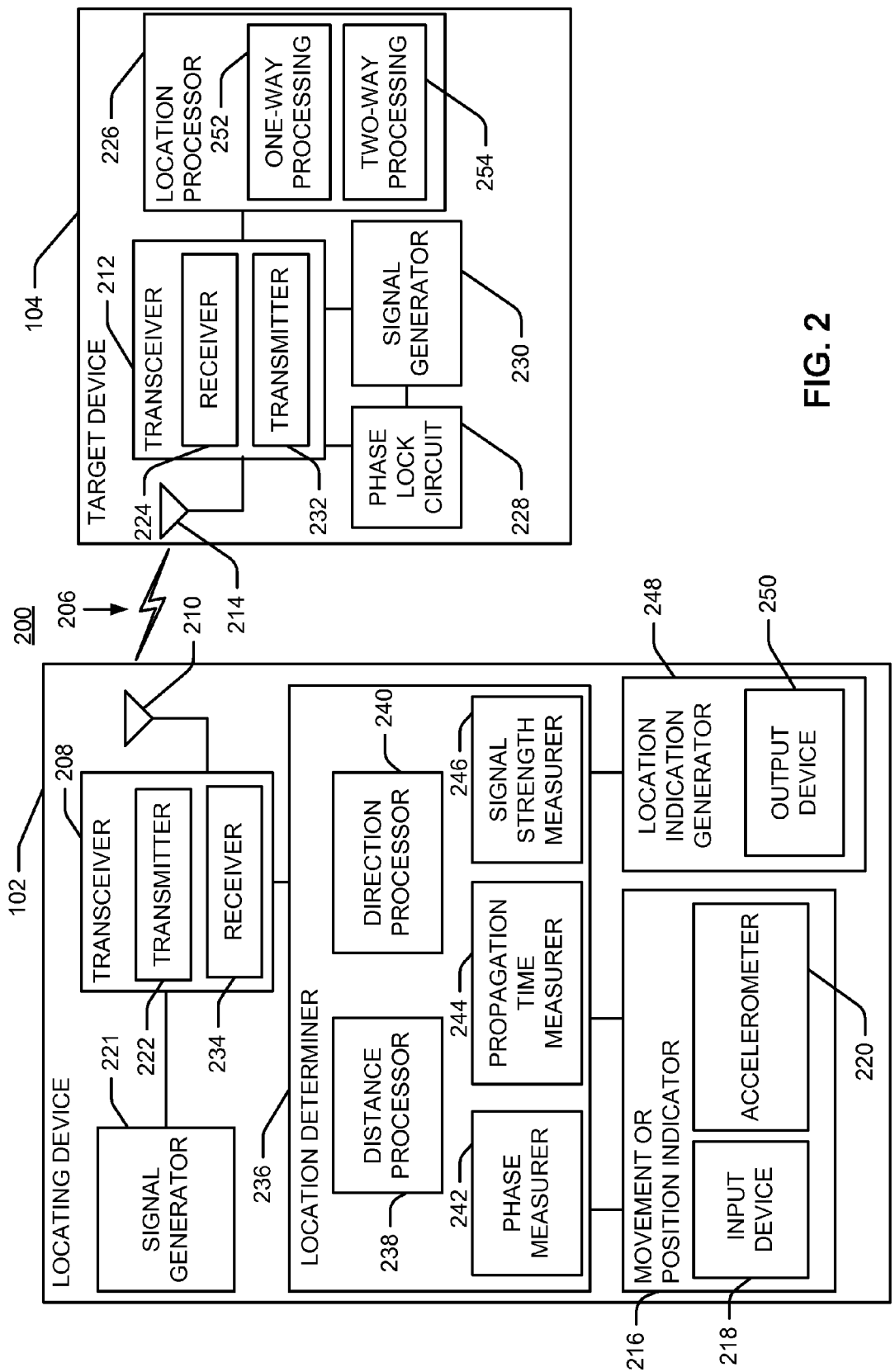
FIG. 2 is a simplified diagram of several sample aspects of a devices that may be employed for locating an object.
Figure 3:
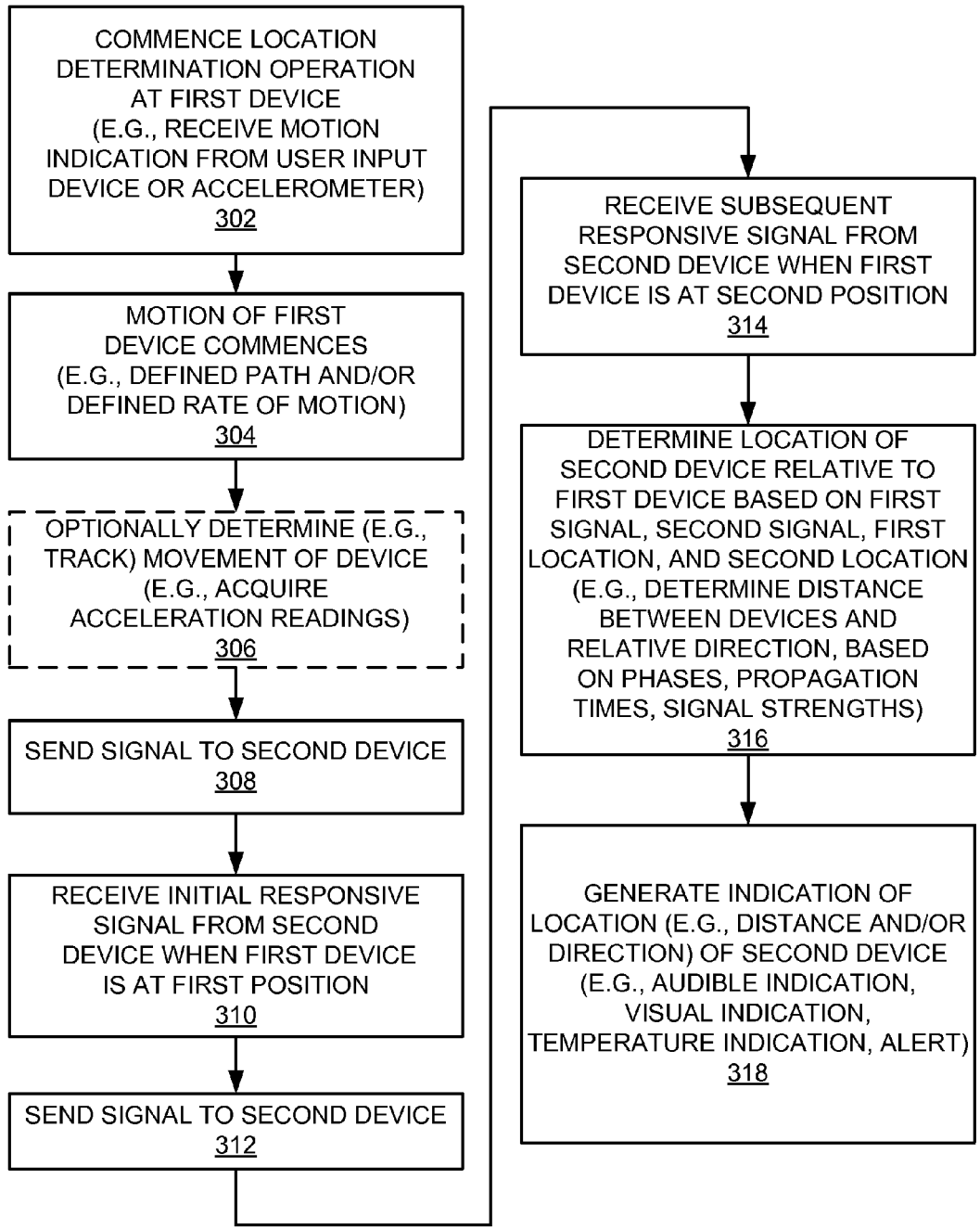
FIG. 3 is a flowchart of several sample aspects of operations that may be performed to locate an object.
Figure 4:
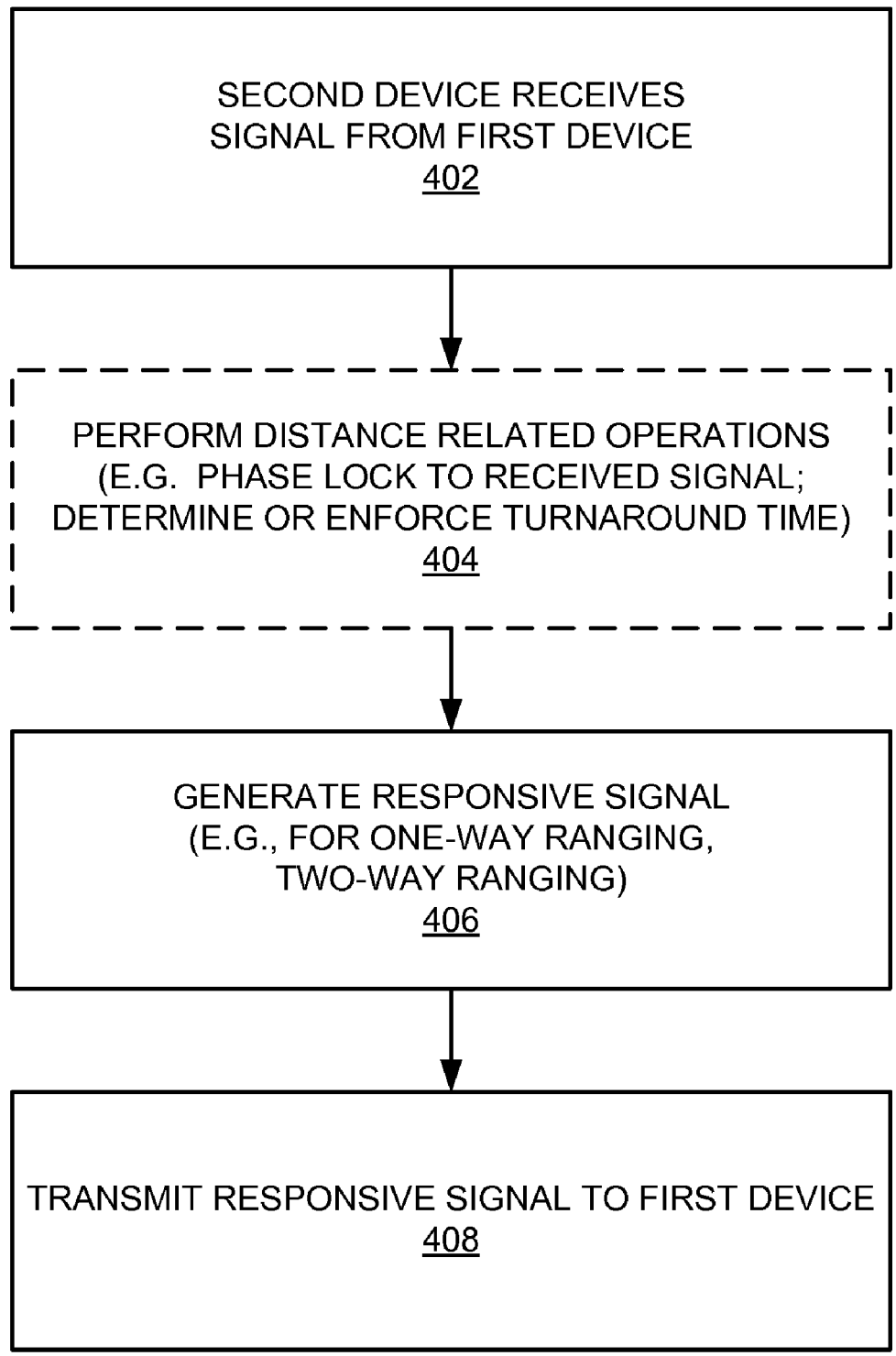
FIG. 4 is a flowchart of several sample aspects of operations that may be performed in conjunction with locating an object.

With the above overview in mind, sample operations that may be performed to locate a device will now be discussed in more detail in conjunction with FIGS. 2, 3, and 4. FIG. 2 illustrates sample functional components that may be incorporated into the devices 102 and 104. FIG. 3 illustrates sample operations that the device 102 may perform to locate the device 104. FIG. 4 illustrates sample operations that the device 104 may perform in conjunction with the operations of the device 102. For convenience, the operations of FIGS. 3 and 4 (or any other operations discussed or taught herein) may be described as being performed by specific components (e.g., the device 102 or the device 104). It should be appreciated, however, that these operations may be performed by other types of components and may be performed using a different number of components. It also should be appreciated that one or more of the operations described herein may not be employed in a given implementation.

In FIG. 2 the device 102 communicates with the device 104 via a wireless communication link 206 to determine the location of the device 104. To this end, the device 102 includes a transceiver 208 and an antenna 210. Similarly, the device 104 includes a transceiver 212 and an antenna 214. Advantageously, the devices 102 and 104 may each employ a single transceiver and a single antenna. It should be appreciated, however, that in some implementations one or both the devices may employ more than one transceiver and antenna. However, in such a case, a given device does not need to employ antennas that are widely spaced apart to perform the location determination operations taught herein.

Referring now to FIG. 3, commencement of a location determination operation is represented by block 302. In some implementations this operation may be commenced based on an indication received from a movement or position indicator 216 (FIG. 2). For example, a user may initiate the location determination operation by activating an input device 218 (e.g., a switch of the device 102). It should be appreciated that other techniques may be employed to commence this operation. For example, in some implementations the location determination operation may become commenced based on movement of the device 102. For example, an accelerometer 220 may be used to determine whether the device 102 has been moved in a defined manner that is associated with commencement of a location determination operation.

As represented by block 304 in FIG. 3, the device 102 is then moved in a manner that facilitates determining the position of the device 204. For example, as discussed above the device 102 may be moved according to a predefined pattern, along a defined path, with a defined rate of motion, in accordance with some other parameter, or in accordance with some combination of one or more of these parameters.

As represented by block 306, the movement of the device 102 may optionally be determined (e.g., tracked). For example, the accelerometer 220 may generate acceleration readings based on the movement of the device 102. These acceleration readings or other suitable readings may then be processed to determine relative locations of the device 102 as it is being moved. For example, acceleration readings may be double integrated versus time to determine the relative positions of the device 102. In some implementations the determination of the movement of the device 102 may commence when the location determination operation commences (e.g., when the input device 218 is actuated at block 302).

As represented by block 308, at some point along the path (e.g., when the device 102 is at a first location) the device 102 transmits a first signal to the device 104 to commence or otherwise perform a distance measurement. In the example of FIG. 2, a signal generator 221 may generate signals for a transmitter 222 that transmits the signals via the communication link 206. In some aspects the transmitter 222 may transmit a signal to the device 104 informing the device 104 that a ranging operation is being commenced. For example, the signal may comprise a message requesting the device 104 to respond with a signal that may be used for a distance determination operation. The signal transmitted by the transmitter 222 may be associated with a one-way ranging operation (e.g., requesting a one-way signal to be sent), a two way ranging operation (e.g., an initial signal used during a calculation of a signal round-trip time), or some other distance determining operation.

FIG. 4 illustrates sample operations that may be performed by the device 104 to generate the responsive signal. As represented by block 402, once a receiver 224 of the transceiver 212 receives the signal from the device 102, the receiver 224 provides corresponding information to a location processor 226.

As represented by block 404, the device 104 performs one or more operations to facilitate the distance measurement being conducted by the device 102. For example, in implementations that utilize a one-way distance measurement scheme, a one-way processing component 252 of the location processor 226 may determine the type of responsive signal that needs to be generated and/or the time at which such a signal may be sent.

In implementations that utilize a two-way (e.g., round-trip time) distance measurement scheme, a two-way processing component 254 of the location processor 226 may determine the signal turnaround time of the device 104 or may enforce a defined turnaround time. Here, the signal turnaround time may relate to the time between receipt of the signal at block 402 and transmission of a responsive signal at block 408 (discussed below).

In some two-way distance measurement schemes the distance related operation may involve a phase lock circuit 228 of the device 104 locking to the phase of the received signal. An example of this type of implementation will be discussed in more detail below in conjunction with FIG. 6.

As represented by block 406, the device 104 may generate an appropriate responsive signal based on the processing of block 404. To this end, the one-way processing component 252 or the two-way processing component 254 may cooperate with a signal generator 230 to provide an appropriate responsive signal for one-way ranging operations, two-way ranging operations, or some other type of ranging operation.

As represented by block 408, a transmitter 232 of the transceiver 212 transmits the responsive signal to the device 102. In some implementations this transmission may be accomplished through the use of the same transceiver and antenna used to receive the signal at block 402.

Referring again to FIG. 3, as represented by block 310 a receiver 234 of the device 102 receives the responsive signal from the device 104. The reception of this signal also may be accomplished through the use of the same transceiver and antenna used to transmit the signal at block 308.

In some aspects the operations of blocks 308 and 310 may be performed when the device 102 is at substantially the same location. For example, in FIG. 1 these initial ranging operations may be performed at or about location A.

As represented by block 312, at some later point along its path (e.g., at a second location) the device 102 transmits a second signal to the device 104 to commence or otherwise perform an additional distance measurement. As represented by block 314, the device 102 may thus receive a subsequent responsive signal from the device 104. Again, in some aspects the operations of blocks 312 and 314 may be performed at substantially the same location. For example, in FIG. 1 these operations may be performed at or about location D.

The flowchart of FIG. 3 illustrates an example where the device 102 initially conducts two distance measurements with respect to the device 104. It should be appreciated that additional distance measurements may be made in a given implementation.

As represented by block 316, a location determiner 236 of the device 102 may determine the location of the device 104 relative to the first device based on the first and second responsive signals and based on the first and second locations of the device 102. Here, a distance processor 238 determines each distance between the devices 102 and 104 using the signals described above in conjunction with blocks 308-314. In addition, the distance processor 238 determines the relative distance between the first and second locations of the device 102 along its path. The location determiner 236 may then determine the relative position of the device 104 by performing a triangulation operation or some other suitable operation on the determined distances between the devices 102 and 104 and the relative distance between the first and second locations of the device 102. For example, a direction processor 240 may determine the relative direction to the device 104 from the device 102.

Figure 5:
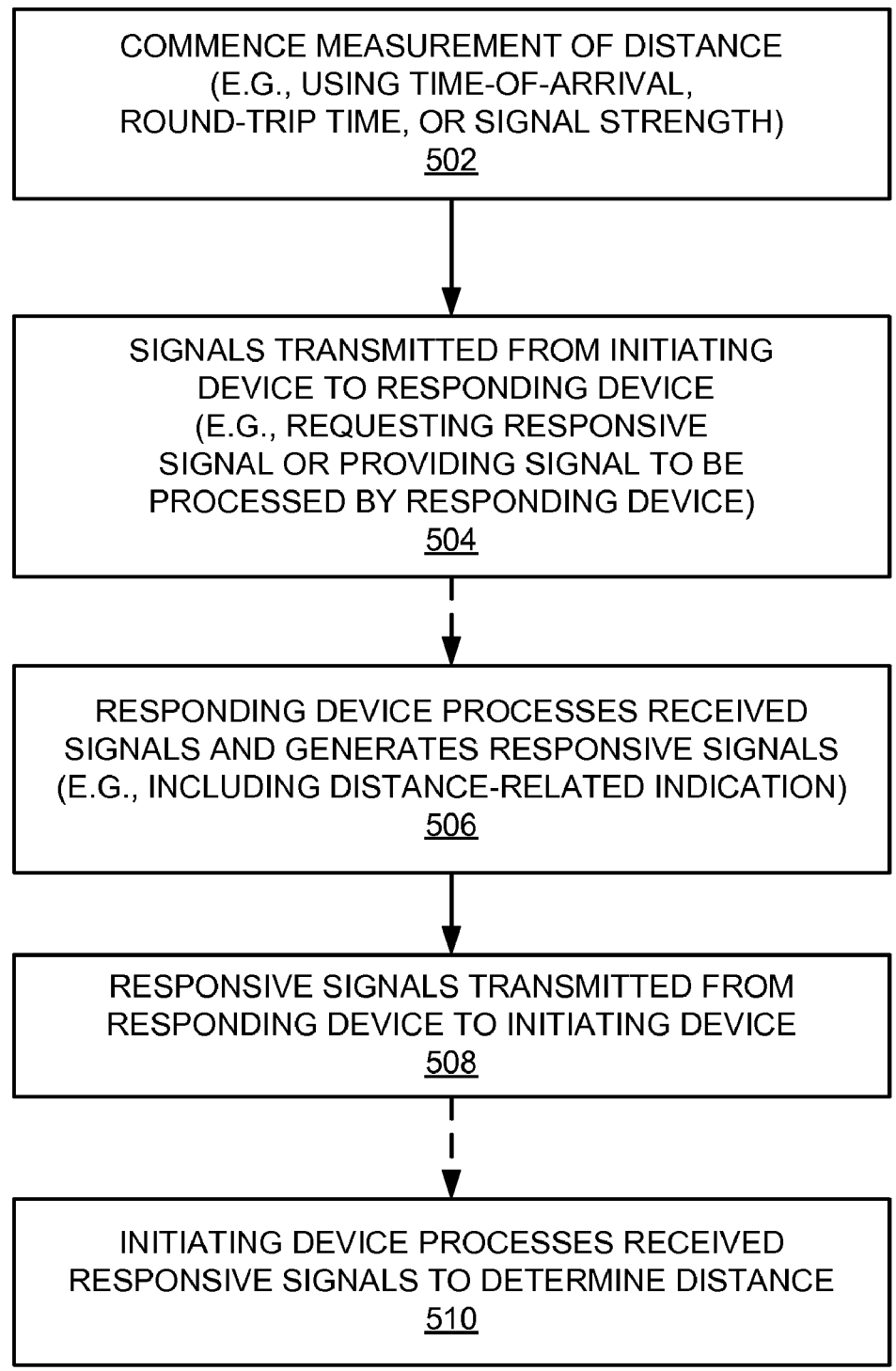
FIG. 5 is a flowchart of several sample aspects of operations that may be performed to determine a distance between devices.

A variety of ranging techniques may be employed to determine the distance between the devices 102 and 104. For example, in some implementations the device 102 may comprise a phase measurer 242 adapted to measure the distance between the devices 102 and 104 based on the phase of a received signal. In some implementations the device 102 may comprise a propagation time measurer 244 adapted to measure the propagation time of a received signal. In some implementations the device 102 may comprise a signal strength measurer 246 adapted to measure the signal strength of a received signal. These techniques will be discussed in more detail below conjunction with FIGS. 5 and 6.

The location determiner 236 may determine the distance between the first and second locations based on known or determined information relating to the path of the device 102. For example, when the device 102 is moved along a defined path, the times at which the device 102 performs each distance measurement (e.g., the times associated with blocks 310 and 314) may be compared with the time the device 102 began moving (e.g., the time associated with block 304). Based on this comparison, the location determiner 236 may determine how far the device 102 had traversed down the defined path when it performed each distance measurement. In this way, the location determiner 236 may determine the expected locations of the device 102 at each of the above times. The location determiner 236 may then calculate a relative distance between the expected locations. This relative distance may then be used for the triangulation or other operations discussed above.

Conversely, when the movement of the device 102 is tracked (e.g., as discussed above in conjunction with block 306) the times at which the device 102 performs each distance measurement may be correlated with the tracking (e.g., acceleration) readings associated with those times. The location determiner 236 may then use this timing information and the associated tracking readings to determine the relative distance between the positions at which the device 102 performed each distance measurement.

As represented by block 318, a location indication generator 248 may then generate an indication of the location of the device 104. As mentioned above, one or more indications may be generated during a location determination operation (e.g., during or shortly after the times associated with blocks 310 and 314) or after the location determination operation has completed. Thus, in the former scenario the operations of blocks 312-318 may be repeated as necessary as the device 102 moves along its path during the location determination operation. In the latter scenario, the operations of block 318 (and optionally block 316) may be performed at the conclusion of the location determination operation.

As discussed above, the indication may indicate the distance between the devices 102 and 104, the direction to the device 104 with respect to the device 102, or both. Such an indication may take the form of an audible indication, a visual indication, a temperature indication, some other suitable indication, or some combination of one or more of these indications. To this end, the location indication generator 248 may comprise an output device 250 adapted to output an indication in the desired form.

In some implementations the output device 250 may comprise a transducer such as a speaker that provides an audible indication by generating a sound or altering a sound based on the determined location. For example, the volume or frequency of a sound may increase as the distance between the devices 102 and 104 decreases. In the example of FIG. 1, assuming the device 102 makes distance measurements at locations A, B, C, and D, the emitted sound may get progressively louder at each successive location. It should be appreciated that the above is but one example of the use of an audible indication and that an audible indication may be generated or utilized in other ways.

The generation of a visual indication may involve generating or altering a visual display based on the determined location. In some implementations the output device 250 may comprise a set of lighting elements that generates the visual indication. For example, certain ones of the lighting elements may be illuminated or changes in color or intensity to indicate the relative distance between the devices 102 and 104.

Lighting elements may be used to generate an indication relating to the direction to the device 104 from the device 102. For example, the lighting elements may be arranged in an arc on the device 102. In this case, one or two of the lighting elements along the arc may be illuminated or changes in color or intensity to illustrate the direction to the device 104.

In some implementations the output device 250 may comprise a display device that generates the visual indication. For example, the display device may display information (e.g., a dynamic bar graph) relating to the relative distance between the devices 102 and 104. The display device also may display the actual distance (e.g., 1 meter) between the devices 102 and 104.

The display device may generate an indication relating to the relative direction to the device 104. For example, the display device may display a pointing mechanism (e.g., an arrow) indicative of the direction to the device 104 or may display other information relating to the direction. As an example of the latter form of indication, the device 102 may display compass-related coordinates (e.g., north, north-northwest, etc.) or directional information (e.g., left, forward, etc.). Again, it should be appreciated that a visual indication may take various other forms.

As mentioned above, in some aspects a temperature indication may be used to indicate the location of the device 104. For example, the output device 250 may comprise a heating and/or cooling element whereby the temperature of the output device 250 may be increased or decreased based on the distance between the devices 102 and 104 or the relative direction from one to the other.

In some implementations, the indication may take the form of an alert signal. Here, the location indication generator 248 may generate an alert signal based on some distance-related criterion or criteria. For example, an alert signal may be generated if the distance between the device 102 and the device 104 is greater than or equal to a threshold distance, is less than or equal to a threshold distance, or is within a range defined by two thresholds.

One or more of various techniques may be employed to determine a distance between the devices 102 and 104. For example, in some implementations distance may be measured using time-of-arrival measurements, round-trip time measurements, signal strength measurements, Doppler shift measurements, or some other suitable technique. Several examples of techniques for measuring distance will be discussed in conjunction with FIG. 5, commencing at block 502.

As represented by block 504, in some implementations a device such as the device 102 that initiates the distance measurement operations sends one or more signals to a responsive device such as device 104. For example, the device 102 may send a message to the device 104 instructing the device 104 to send one or more signals back to the device 102. Thus, in the example of FIG. 2 the location determiner 236 of the device 102 may cooperate with the transceiver 208 to transmit appropriate signals to the device 104.

As represented by block 506, the device 104 may process the received signals and generate responsive signals (e.g., forming a message). In the example of FIG. 2 the location processor 226 may cooperate with the transceiver 212 to receive signals from the device 102.

As represented by block 508, the responsive signals are then transmitted from the device 104 to the device 102. In FIG. 2 the location processor 226 may again cooperate with the transceiver 212 to transmit the signals to the device 102.

As represented by block 510, the device 102 (e.g., the distance processor 238) processes the received responsive signals, as necessary, to determine the distance between the devices 102 and 104. To this end, the location determiner 236 may again cooperate with the transceiver 208 to receive signals from the device 104.

Sample operations of blocks 504-510 will now be discussed in more detail in conjunction with specific examples relating to time-of-arrival measurements, round-trip time measurements and signal strength measurements. It should be appreciated that these are but a few of the measurement techniques that may be employed and that the teachings herein may be used in conjunction with other measurement techniques.

In some implementations the device 102 may implement a one-way time-of-arrival scheme by measuring the time-of-arrival of a signal received from the device 104. For example, at block 504 the device 102 (e.g., the location determiner 236) may request that the device 104 transmit one or more signals to be used for time-of-arrival measurements. At blocks 506 and 508, the device 104 may then generate appropriate signals and transmit them to the device 102. For example, the location processor 226 may cause the signal generator 230 and the transceiver 212 to transmit appropriate signals to the transceiver 208. Then, at block 510 the propagation time measurer 244 may perform time-of-arrival measurements and, based on these measurements, the distance processor 238 may determine the distance between the device 102 and the device 104. Here, the devices 102 and 104 may cooperate to provide some form of synchronization to enable the propagation time measurer 244 to determine the time at which the device 104 transmitted the signals at block 508.

In some implementations the device 102 utilizes round-trip time measurements to determine the distance between the devices 102 and 104. At block 504, the device 102 may transmit a message to the device 104 at a given time. At block 506 the location processor 226 may determine the amount of time between receipt of the request signal by the device 104 and the transmission of a responsive signal by the device 104 (i.e., a turnaround time). Alternatively, in cooperation with the signal generator 230 and the transceiver 212, the location processor 226 may ensure that a response signal is transmitted within a defined a turnaround time. The device 104 may thus generate a responsive message (e.g., including an indication of the turnaround time) and transmit the message to the device 102 (block 508). At block 510 the propagation time measurer 244 processes the received responsive signal to calculate the round-trip time and, based on this time, the distance processor 238 determines the distance between the devices 102 and 104. To this end, the propagation time measurer 244 may determine (e.g., in cooperation with the transceiver 208) the point in time at which the initial signal was transmitted by the transceiver 208 at block 504 and the point in time at which the responsive message was received by the transceiver 208 at block 510. The distance processor 238 may then determine the round-trip time based on the time elapsed between the transmission time of block 504 and the reception time of block 510, excluding the turnaround time of the device 104. As mentioned above, the turnaround time may be defined or it may be included with the responsive message.

In some implementations the device 102 may measure the signal strength of signals received from the device 104 to determine the distance between the devices 102 and 104. For example, at block 504 the device 102 may transmit a message to the device 104 requesting that the device 104 transmit a signal at a known signal strength (e.g., a constant energy level). At block 506, in response to the received signal the device 104 (e.g., the location processor 226 in cooperation with the signal generator 230) may cause the transceiver 212 to transmit an appropriate signal or signals to the device 102 (block 508). At block 510, the distance processor 238 in cooperation with the signal strength measurer 246 may then calculate the distance between the devices 102 and 104 based on the strength of the corresponding signal(s) received by the transceiver 208.

In some aspects the device 102 may determine the position (e.g., distance and/or direction) of the device 104 based on the phase of a signal received from the device 104. In some implementations, the device 102 may use relative phase information to determine the relative direction to the device 104 from the device 102 without determining an actual distance to the device 104. For example, the device 102 may measure the different phases at two different locations (e.g., the change in phase as the device 102 is moved) and process (e.g., by triangulation, trilateration, etc.) this phase information in conjunction with the determined or known movement of the device 102 to determine the direction to the device 104.

Various signaling schemes may be employed in conjunction with the determination of the phase of a received signal. For example, some implementations may utilize a one-way phase measurement technique whereby the device 102 (e.g., the phase measurer 242) determines the phase of the signal transmitted by the device 104 based on information known about the transmission of the signal by the device 104. Such information may include, for example, the time of transmission of the signal, the phase of the signal at a certain time (e.g., the time of transmission), any modulation that may be applied to the signal, or any other information that may facilitate determining distance or direction. As an example, a phase signal may be modulated (e.g., in frequency) such that the signal varies in a deterministic manner. Here, the rate at which the signal varies may be defined such that a device (e.g., the device 102) that receives the signal may readily determine the distance covered by the signal based on the degree to which the signal has changed.

In some implementations the device 104 may transmit a signal that is based on phase information provided by a signal transmitted by the device 102. For example, the device 104 may transmit a signal that is locked to the phase of a signal received from the device 102.

Figure 6:
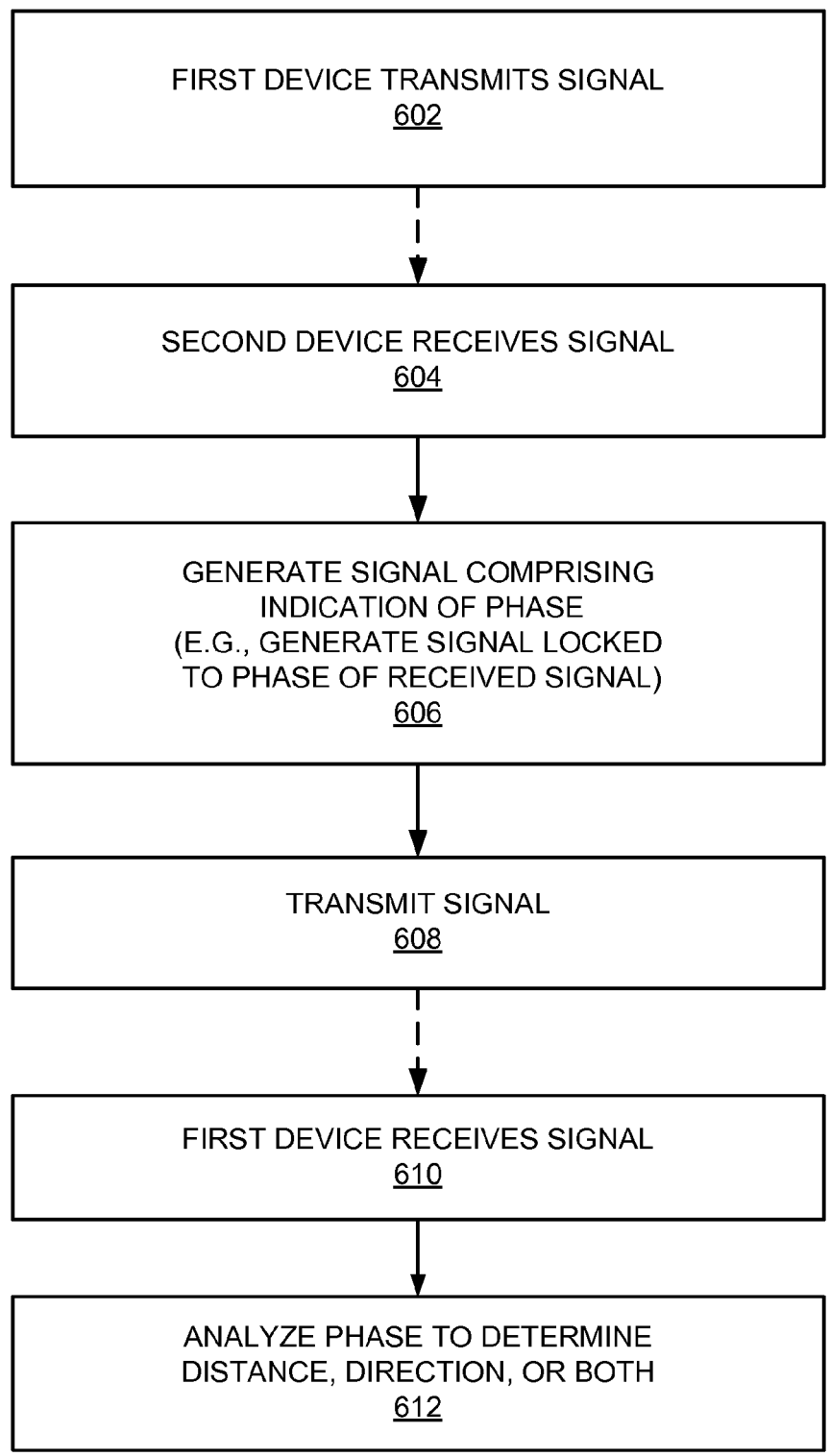
FIG. 6 is a flowchart of several sample aspects of operations that may be performed to determine a distance between devices.

Referring now to FIG. 6, as represented by block 602 the device 102 transmits a signal to the device 104 to initiate a phase measurement operation. In implementations that utilize a phase lock-based measurement technique, the signal generated at block 602 may comprise a signal to which the device 104 will lock.

In implementations that utilize a one-way phase measurement technique, this signal may simply request that the device 104 commence transmission of a responsive signal. In addition, in some implementations the signal transmitted at block 602 may relate to synchronization between the devices 102 and 104. For example, the signal may instruct the device 104 to transmit the signal at a certain time and/or with a certain phase.

As represented by block 604, the device 104 receives the signal transmitted at block 602. As represented by block 606, the signal generator 230 of the device 104 may then generate a signal comprising an indication of phase.

For example, in implementations that utilize a one-way phase measurement technique, the signal generated at block 606 may comprise a message including information indicative of a time at which the signal is transmitted, the type of modulation applied to the signal (if any), the phase of the signal upon transmission (or at certain time), or some combination of this information.

In implementations that utilize a phase lock-based measurement technique, the signal generated at block 606 may be based on the phase of the signal received at block 604. For example, the phase lock circuit 228 may lock to the phase of the signal received by the receiver 224. This phase information may then be provided (e.g., as a signal) to the signal generator 230 that generates the phase signal at block 606.

As represented by blocks 608 and 610, the transmitter 232 transmits the phase signal to the receiver 234 of the device 102. As represented by block 610 the location determiner 236 in cooperation with the phase measurer 242 may analyze the phase of the received signal to determine the distance between the devices 102 and 104, the relative direction to the device 104 from the device 102, or both. In an implementation that utilizes a one-way phase measurement technique, this determination may be based on information known about the phase of the signal transmitted by the device 104. In an implementation that utilizes a two-way phase measurement technique, the phase measurer 242 may compare the phase of the signal received at block 610 with the phase of the signal transmitted at block 602 to determine the round-trip phase change.

In some implementations, the device 102 may conduct multiple phase measurements. For example, in implementations that use relatively high signaling rates (e.g., in the gigahertz range) the distance between the devices 102 and 104 may exceed the wavelength of the signal. In such a case, multiple phase measurements may be employed (e.g., as the device 102 is moved) to determine the particular cycle with which the received signal is associated.

Figure 7:
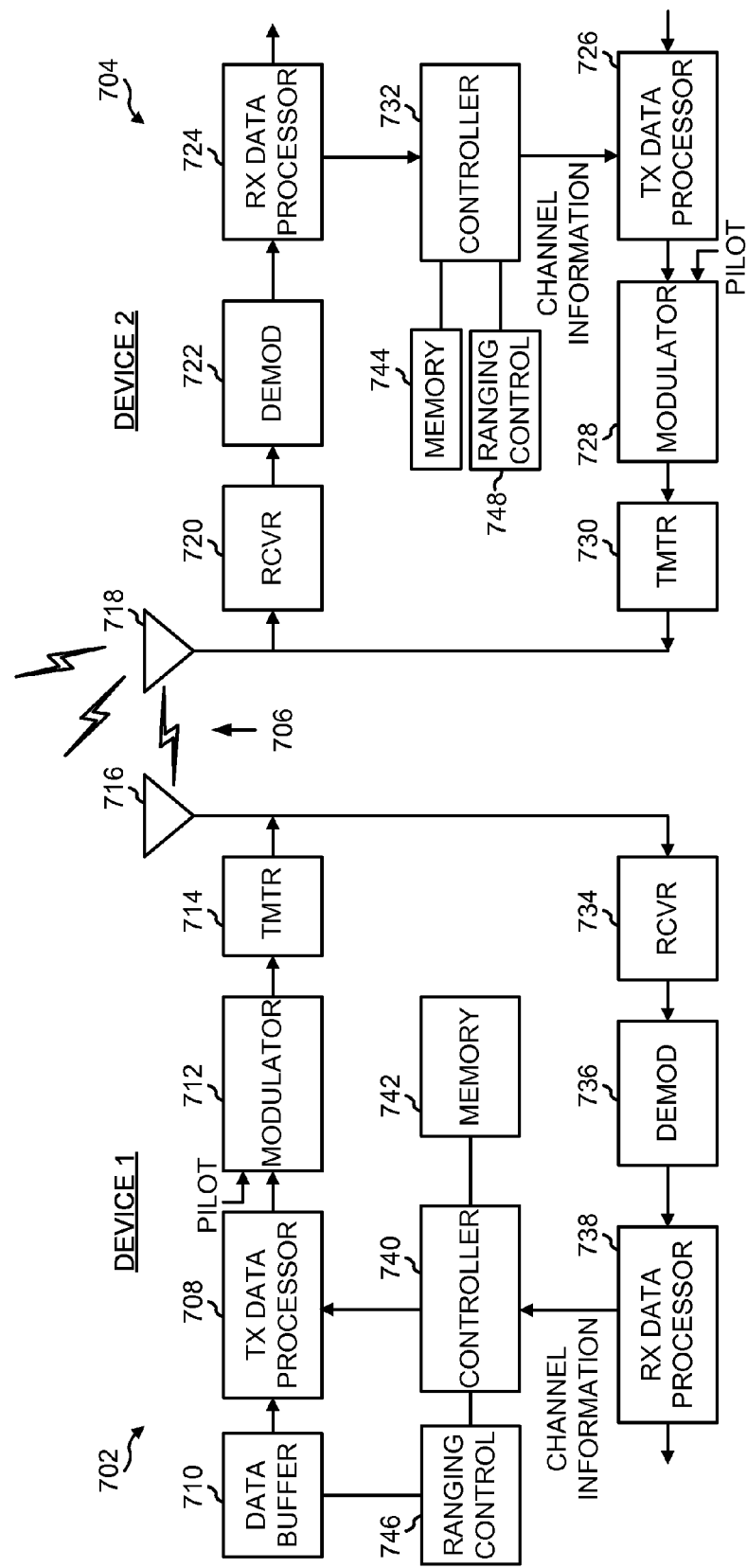
FIG. 7 is a simplified block diagram of several sample aspects of communication components.

The teachings herein may be incorporated into a device employing various components for communicating with at least one other device. FIG. 7 depicts several sample components that may be employed to facilitate communication between devices. Here, a first device 702 and a second device 704 are adapted to communicate via a wireless communication link 706 over a suitable medium.

Initially, components involved in sending information from the device 702 to the device 704 (e.g., a reverse link) will be treated. A transmit ("TX") data processor 708 receives traffic data (e.g., data packets) from a data buffer 710 or some other suitable component. The transmit data processor 708 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 712 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 714 processes (e.g., converts to analog, filters, amplifies, and frequency upconverts) the output chip stream and generates a modulated signal, which is then transmitted from an antenna 716.

The modulated signals transmitted by the device 702 (along with signals from other devices in communication with the device 704) are received by an antenna 718 of the device 704. A receiver ("RCVR") 720 processes (e.g., conditions and digitizes) the received signal from the antenna 718 and provides received samples. A demodulator ("DEMOD") 722 processes (e.g., demodulates and detects) the received samples and provides detected data symbols, which may be a noisy estimate of the data symbols transmitted to the device 704 by the other device(s). A receive ("RX") data processor 724 processes (e.g., symbol demaps, deinterleaves, and decodes) the detected data symbols and provides decoded data associated with each transmitting device (e.g., device 702).

Components involved in sending information from the device 704 to the device 702 (e.g., a forward link) will be now be treated. At the device 704, traffic data is processed by a transmit ("TX") data processor 726 to generate data symbols. A modulator 728 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 730 and transmitted from the antenna 718. In some implementations signaling for the forward link may include power control commands and other information (e.g., relating to a communication channel) generated by a controller 732 for all devices (e.g. terminals) transmitting on the reverse link to the device 704.

At the device 702, the modulated signal transmitted by the device 704 is received by the antenna 716, conditioned and digitized by a receiver ("RCVR") 734, and processed by a demodulator ("DEMOD") 736 to obtain detected data symbols. A receive ("RX") data processor 738 processes the detected data symbols and provides decoded data for the device 702 and the forward link signaling. A controller 740 receives power control commands and other information to control data transmission and to control transmit power on the reverse link to the device 704.

The controllers 740 and 732 direct various operations of the device 702 and the device 704, respectively. For example, a controller may determine an appropriate filter, reporting information about the filter, and decode information using a filter. Data memories 742 and 744 may store program codes and data used by the controllers 740 and 732, respectively.

FIG. 7 also illustrates that the communication components may include one or more components that perform ranging-related operations as taught herein. For example, a ranging control component 746 may cooperate with the controller 740 and/or other components of the device 702 to send and receive ranging-related signals and information to another device (e.g., device 704). Similarly, a ranging control component 748 may cooperate with the controller 732 and/or other components of the device 704 to send and receive ranging-related signals and information to another device (e.g., device 702).

A wireless device may include various components that perform functions based on signals that are transmitted via a transmitter or received via a receiver of the wireless device. For example, a headset may include a transducer adapted to provide an audible output based on a signal received via the receiver. A watch may include a display adapted to provide a visual output based on a signal received via the receiver. A medical device may include a sensor adapted to generate sensed data to be transmitted via the transmitter.

A wireless device may communicate via one or more wireless communication links that are based on or otherwise support any suitable wireless communication technology. For example, in some aspects a wireless device may associate with another device via a network. In some aspects the network may comprise a body area network or a personal area network (e.g., an ultra-wideband network). In some aspects the network may comprise a local area network or a wide area network. A wireless device may support or otherwise use one or more of a variety of wireless communication protocols or standards including, for example, CDMA, TDMA, OFDM, OFDMA, WiMAX, Wi-Fi, and other wireless technologies. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., the transmitters 222 and 232 and the receivers 224 and 234) that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds) and a relatively wide bandwidth. In some aspects each of the ultra-wideband pulses may have a fractional bandwidth on the order of approximately 20% or more and/or have a bandwidth on the order of approximately 500 MHz or more.

In some implementations impulse-based ultra-wideband signaling may be used to determine the distance between devices. For example, through the use of pulses having a wavelength that is shorter than the distance between the devices, the relative timing of the pulses may be effectively determined. In some implementations that utilize signaling in the gigahertz range (e.g., as in some body area network implementations), tracking may be provided for distances up to on the order of 10 to 30 meters.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Figure 8:
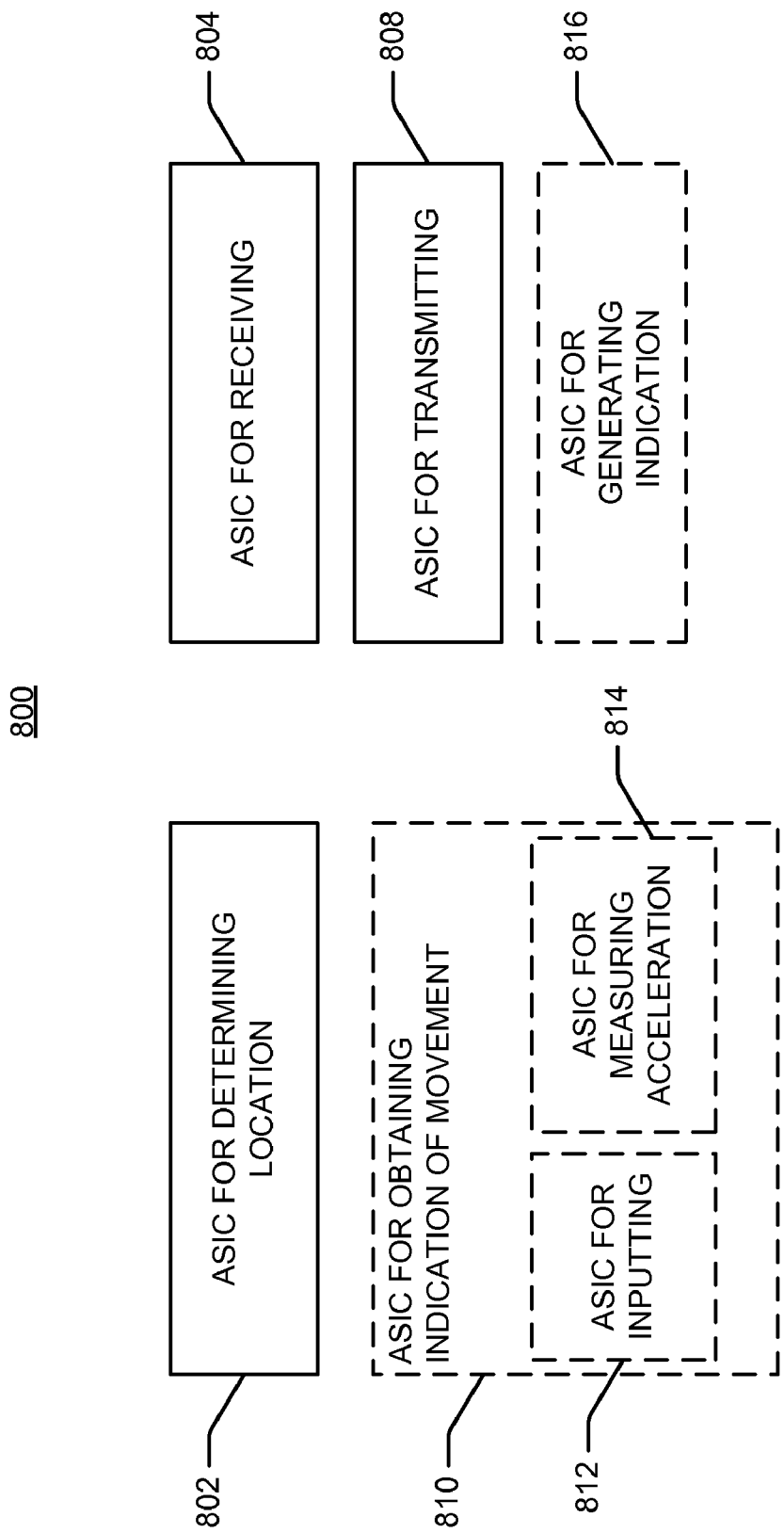
FIG. 8 is a simplified diagram of several sample aspects of an object locating apparatus.

The components described herein may be implemented in a variety of ways. Referring to FIG. 8, an apparatus 800 is represented as a series of interrelated functional blocks that may represent functions implemented by, for example, one or more integrated circuits (e.g., an ASIC) or that may be implemented in some other manner as taught herein. As discussed herein, an integrated circuit may include a processor, software, other components, or some combination thereof.

As shown in FIG. 8, the apparatus 800 may include one or more modules 802, 804, 808, 810, 812, 814, and 816 that may perform one or more of the functions described above with regard to various figures. For example, an ASIC for determining location 802 may provide functionality relating to determining a location as taught herein and may correspond to, for example, component 236 discussed above. An ASIC for receiving 804 may provide functionality relating to receiving signals as taught herein and may correspond to, for example, component 234 discussed above. An ASIC for transmitting 808 may provide functionality relating to transmitting signals as taught herein and may correspond to, for example, component 222 discussed above. An ASIC for obtaining indication of movement 810 may provide functionality relating to a movement or position indication as taught herein and may correspond to, for example, component 216 discussed above. An ASIC for inputting 812 may provide functionality relating to receiving input as taught herein and may correspond to, for example, component 218 discussed above. An ASIC for measuring acceleration 814 may provide functionality relating to measuring acceleration as taught herein and may correspond to, for example, component 220 discussed above. An ASIC for generating indication 816 may provide functionality relating to generating one or more indications as taught herein and may correspond to, for example, component 248 discussed above.

As noted above, in some aspects these components may be implemented via appropriate processor components. These processor components may in some aspects be implemented, at least in part, using structure as taught herein. In some aspects a processor may be adapted to implement a portion or all of the functionality of one or more of the above components. In some aspects one or more of the components represented by dashed boxes are optional.

As noted above, the apparatus 800 may comprise one or more integrated circuits that provide the functionality of the components illustrated in FIG. 8. For example, in some aspects a single integrated circuit may implement the functionality of the illustrated components, while in other aspects more than one integrated circuit may implement the functionality of the illustrated components.

In addition, the components and functions represented by FIG. 8, as well as other components and functions described herein, may be implemented using any suitable means. Such means also may be implemented, at least in part, using corresponding structure as taught herein. For example, in some aspects means for determining location may comprise a location determiner, means for receiving may comprise a receiver, means for transmitting may comprise a transmitter, means for obtaining indication of movement may comprise a movement or position indicator, means for inputting may comprise an input device, means for measuring acceleration may comprise an accelerometer, and means for generating indication may comprise an indication generator. One or more of such means also may be implemented in accordance with one or more of the processor components of FIG. 8.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. In addition, any reference to these aspects in the singular form (e.g., a reference to "a signal") may mean one or more of such aspects (e.g., "one or more signals").

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of locating a device, comprising:
   transmitting at least one signal from a first device to a second device;
   receiving, by the first device at a first location, a first signal transmitted by the second device in response to the at least one signal;
   providing instruction to move the first device from the first location to a second location along a defined path and with a defined rate of motion;
   receiving, by the first device at the second location, a second signal transmitted by the second device in response to the at least one signal;
   receiving, by the first device at a third location along the defined path between the first and second locations, a third signal transmitted by the second device in response to the at least one signal;
   determining the third location based on the first location, the defined path, and the defined rate of motion; and
   determining a location of the second device relative to the first device based on the first signal, the second signal, the third signal, the first location, the second location, and the third location.

2. The method of claim 1, wherein the determination of the location of the second device comprises at least one of the group consisting of: determining at least one distance between the second device and the first device, and determining at least one direction to the second device from the first device.

3. The method of claim 1, further comprising generating at least one indication of at least one of the group consisting of: at least one distance between the second device and the first device, and at least one direction to the second device from the first device.

4. The method of claim 3, wherein the at least one indication comprises at least one of the group consisting of: an audible indication, a visual indication, and a temperature indication.

5. The method of claim 3, wherein the at least one indication comprises a visual display of at least one of the group consisting of: the at least one distance between the second device and the first device, and the at least one direction to the second device from the first device.

6. The method of claim 3, wherein the at least one indication comprises a distance-based alert.

7. The method of claim 1, wherein the determination of the location is based on at least one of the group consisting of: phases of the first and second signals, propagation times of the first and second signals, and received signal strengths of the first and second signals.

8. The method of claim 1, further comprising measuring acceleration of the first device to determine a relative distance between the first and second locations.

9. The method of claim 1, further comprising measuring acceleration of the first device to determine a path of motion of the first device including the first location and the second location.

10. The method of claim 1, wherein the first and second signals are received via a single antenna of the first device.

11. The method of claim 10, wherein the first and second signals were transmitted via a single antenna of the second device.

12. The method of claim 1, wherein the at least one signal and the first and second signals are associated with two-way ranging or one-way ranging.

13. The method of claim 1, wherein the determination of the location of the second device comprises determining a first distance from the first location to the second device and determining a second distance from the second location to the second device.

14. The method of claim 13, further comprising generating at least one indication of whether the first location is closer to the second device than the second location.

15. The method of claim 1, further comprising determining movement of the first device.

16. The method of claim 15, wherein the determination of movement comprises measuring acceleration of the first device.

17. The method of claim 15, wherein the determination of movement is initiated by a user input device.

18. The method of claim 1, wherein the first and second signals each comprise ultra-wideband pulses.

19. The method of claim 18, wherein each of the ultra-wideband pulses has a fractional bandwidth on the order of 20% or more, has a bandwidth on the order of 500 MHz or more, or has a fractional bandwidth on the order of 20% or more and has a bandwidth on the order of 500 MHz or more.

20. The method of claim 1, wherein the first device communicates with the second device via a personal area network or a body area network.

21. An apparatus for locating a device, comprising:
a user interface adapted to provide instruction to move the apparatus from a first location to a second location along a defined path and with a defined rate of motion;
a transmitter adapted to transmit at least one signal to a device;
a receiver adapted to:
receive, at the first location, a first signal transmitted by the device in response to the at least one signal,
receive, at the second location, a second signal transmitted by the device in response to the at least one signal, and
receive, at a third location along the defined path between the first and second locations, a third signal transmitted by the device in response to the at least one signal; and
a location determiner adapted to:
determine the third location based on the first location, the defined path, and the defined rate of motion; and
determine a location of the device relative to the apparatus based on the first signal, the second signal, the third signal, the first location, the second location, and the third location.

22. The apparatus of claim 21, wherein the location determiner is further adapted to determine at least one of the group consisting of: at least one distance between the device and the apparatus, and at least one direction to the device from the apparatus.

23. The apparatus of claim 21, further comprising an indication generator adapted to generate at least one indication of at least one of the group consisting of: at least one distance between the device and the apparatus, and at least one direction to the device from the apparatus.

24. The apparatus of claim 23, wherein the at least one indication comprises at least one of the group consisting of: an audible indication, a visual indication, and a temperature indication.

25. The apparatus of claim 23, wherein the at least one indication comprises a visual display of at least one of the group consisting of: the at least one distance between the device and the apparatus, and the at least one direction to the device from the apparatus.

26. The apparatus of claim 23, wherein the at least one indication comprises a distance-based alert.

27. The apparatus of claim 21, wherein the location determiner is further adapted to determine the location based on at least one of the group consisting of: phases of the first and second signals, propagation times of the first and second signals, and received signal strengths of the first and second signals.

28. The apparatus of claim 21, further comprising an accelerometer adapted to measure acceleration of the apparatus to determine a relative distance between the first and second locations.

29. The apparatus of claim 21, further comprising an accelerometer adapted to measure acceleration of the apparatus to determine a path of motion of the apparatus including the first location and the second location.

30. The apparatus of claim 21, wherein the first and second signals are received via a single antenna of the apparatus.

31. The apparatus of claim 30, wherein the first and second signals were transmitted via a single antenna of the device.

32. The apparatus of claim 21, wherein the at least one signal and the first and second signals are associated with two-way ranging or one-way ranging.

33. The apparatus of claim 21, wherein the location determiner is further adapted to determine a first distance from the first location to the device and determine a second distance from the second location to the device.

34. The apparatus of claim 33, further comprising an indication generator adapted to generate at least one indication of whether the first location is closer to the device than the second location.

35. The apparatus of claim 21, further comprising a movement indicator adapted to determine movement of the apparatus.

36. The apparatus of claim 35, wherein the movement indicator comprises an accelerometer.

37. The apparatus of claim 35, further comprising an input device adapted to initiate the determination of movement.

38. The apparatus of claim 21, wherein the first and second signals each comprise ultra-wideband pulses.

39. The apparatus of claim 38, wherein each of the ultra-wideband pulses has a fractional bandwidth on the order of 20% or more, has a bandwidth on the order of 500 MHz or more, or has a fractional bandwidth on the order of 20% or more and has a bandwidth on the order of 500 MHz or more.

40. The apparatus of claim 21, wherein the apparatus communicates with the device via a personal area network or a body area network.

41. An apparatus for locating a device, comprising:
means for providing instruction to move the apparatus from a first location to a second location along a defined path and with a defined rate of motion;
means for transmitting at least one signal to a device;
means for:
receiving, at the first location, a first signal transmitted by the device in response to the at least one signal,
receiving, at the second location, a second signal transmitted by the device in response to the at least one signal, and
receiving, at a third location along the defined path between the first and second locations, a third signal transmitted by the device in response to the at least one signal;
means for determining the third location based on the first location, the defined path, and the defined rate of motion; and
means for determining a location of the device relative to the apparatus based on the first signal, the second signal, the third signal, the first location, the second location, and the third location.

42. The apparatus of claim 41, wherein the means for determining a location determines at least one of the group consisting of: at least one distance between the device and the apparatus, and at least one direction to the device from the apparatus.

43. The apparatus of claim 41, further comprising means for generating at least one indication of at least one of the group consisting of: at least one distance between the device and the apparatus, and at least one direction to the device from the apparatus.

44. The apparatus of claim 43, wherein the at least one indication comprises at least one of the group consisting of: an audible indication, a visual indication, and a temperature indication.

45. The apparatus of claim 43, wherein the at least one indication comprises a visual display of at least one of the group consisting of: the at least one distance between the device and the apparatus, and the at least one direction to the device from the apparatus.

46. The apparatus of claim 43, wherein the at least one indication comprises a distance-based alert.

47. The apparatus of claim 41, wherein the means for determining a location determines the location based on at least one of the group consisting of: phases of the first and second signals, propagation times of the first and second signals, and received signal strengths of the first and second signals.

48. The apparatus of claim 41, further comprising means for measuring acceleration of the apparatus to determine a relative distance between the first and second locations.

49. The apparatus of claim 41, further comprising means for measuring acceleration of the apparatus to determine a path of motion of the apparatus including the first location and the second location.

50. The apparatus of claim 41, wherein the first and second signals are received via a single antenna of the apparatus.

51. The apparatus of claim 50, wherein the first and second signals were transmitted via a single antenna of the device.

52. The apparatus of claim 41, wherein the at least one signal and the first and second signals are associated with two-way ranging or one-way ranging.

53. The apparatus of claim 41, wherein the means for determining a location determines a first distance from the first location to the device and determines a second distance from the second location to the device.

54. The apparatus of claim 53, further comprising means for generating at least one indication of whether the first location is closer to the device than the second location.

55. The apparatus of claim 41, further comprising means for determining movement of the apparatus.

56. The apparatus of claim 55, wherein the means for determining movement comprises means for determining acceleration.

57. The apparatus of claim 55, further comprising means for inputting to initiate the determination of movement.

58. The apparatus of claim 41, wherein the first and second signals each comprise ultra-wideband pulses.

59. The apparatus of claim 58, wherein each of the ultra-wideband pulses has a fractional bandwidth on the order of 20% or more, has a bandwidth on the order of 500 MHz or more, or has a fractional bandwidth on the order of 20% or more and has a bandwidth on the order of 500 MHz or more.

60. The apparatus of claim 41, wherein the apparatus communicates with the device via a personal area network or a body area network.

61. The apparatus of claim 41, wherein:
phases of the first and second signals were phase locked to the at least one signal transmitted from the apparatus to the device; and
the means for determining a location determines the location based on phases of the received first and second signals.

62. A computer-program product for locating a device, comprising:
a computer-readable storage medium comprising codes executable by at least one computer to:
transmit at least one signal to a device;
receive, at a first location, a first signal transmitted by the device in response to the at least one signal;
provide instruction to move the at least one computer from the first location to a second location along a defined path and with a defined rate of motion;
receive, at the second location, a second signal transmitted by the device in response to the at least one signal;
receive, at a third location along the defined path between the first and second locations, a third signal transmitted by the device in response to the at least one signal;
determine the third location based on the first location, the defined path, and the defined rate of motion; and
determine a location of the device relative to the at least one computer based on the first signal, the second signal, the third signal, the first location, the second location, and the third location.

63. A headset for wireless communication, comprising:
a user interface adapted to provide instruction to move the headset from a first location to a second location along a defined path and with a defined rate of motion;
a transmitter adapted to transmit at least one signal to a device;
a receiver adapted to:
receive, at the first location, a first signal transmitted by the device in response to the at least one signal,
receive, at the second location, a second signal transmitted by the device in response to the at least one signal, and
receive, at a third location along the defined path between the first and second locations, a third signal transmitted by the device in response to the at least one signal;
a location determiner adapted to:
determine the third location based on the first location, the defined path, and the defined rate of motion; and
determine a location of the device relative to the headset based on the first signal, the second signal, the third signal, the first location, the second location, and the third location; and
a transducer adapted to provide an audible output based on a signal received via the receiver.

64. A watch for wireless communication, comprising:
a user interface adapted to provide instruction to move the watch from a first location to a second location along a defined path and with a defined rate of motion;
a transmitter adapted to transmit at least one signal to a device;
a receiver adapted to:
receive, at the first location, a first signal transmitted by the device in response to the at least one signal,
receive, at the second location, a second signal transmitted by the device in response to the at least one signal, and
receive, at a third location along the defined path between the first and second locations, a third signal transmitted by the device in response to the at least one signal;
a location determiner adapted to:
determine the third location based on the first location, the defined path, and the defined rate of motion; and
determine a location of the device relative to the watch based on the first signal, the second signal, the third signal, the first location, the second location, and the third location; and
a display adapted to provide a visual output based on a signal received via the receiver.

65. A medical device for wireless communication, comprising:
- a user interface adapted to provide instruction to move the medical device from a first location to a second location along a defined path and with a defined rate of motion;
- a transmitter adapted to transmit at least one signal to a device;
- a receiver adapted to:
  - receive, at the first location, a first signal transmitted by the device in response to the at least one signal,
  - receive, at the second location, a second signal transmitted by the device in response to the at least one signal, and
  - receive, at a third location along the defined path between the first and second locations, a third signal transmitted by the device in response to the at least one signal;
- a location determiner adapted to:
  - determine the third location based on the first location, the defined path, and the defined rate of motion; and
  - determine a location of the device relative to the medical device based on the first signal, the second signal, the third signal, the first location, the second location, and the third location; and
- a sensor adapted to generate sensed data to be transmitted via the transmitter.

66. The method of claim 1, wherein:
- phases of the first and second signals were phase locked to the at least one signal transmitted from the first device to the second device; and
- the determination of the location is based on phases of the received first and second signals.

67. The apparatus of claim 21, wherein:
- phases of the first and second signals were phase locked to the at least one signal transmitted from the apparatus to the device; and
- the location determiner is further adapted to determine the location based on phases of the received first and second signals.

68. The method of claim 1, wherein the defined path comprises a plurality of segments, and further comprising receiving an indication from a user of the first device when movement of the first device along each of the segments is complete.

69. The method of claim 1, wherein transmitting the at least one signal from the first device to the second device is initiated by the first device being moved in a defined manner.

70. The method of claim 1, wherein the at least one signal comprises fourth and fifth signals, wherein the second signal transmitted by the second device is in response to the fourth signal, and wherein the third signal transmitted by the second device is in response to the fifth signal.

* * * * *